(12) United States Patent
Kaminaga (10) Patent No.: US 9,953,170 B2
(45) Date of Patent: Apr. 24, 2018

(54) SEMICONDUCTOR MEMORY DEVICE, SEMICONDUCTOR SYSTEM AND READING METHOD

(71) Applicant: Winbond Electronics Corp., Taichung (TW)

(72) Inventor: Takehiro Kaminaga, Tokyo (JP)

(73) Assignee: Winbound Electronics Corp., Taichung (TW)

( * ) Notice: Subject to any disclaimer, the term of this patent is extended or adjusted under 35 U.S.C. 154(b) by 125 days.

(21) Appl. No.: 14/567,326

(22) Filed: Dec. 11, 2014

(65) Prior Publication Data

US 2015/0324122 A1 Nov. 12, 2015

(30) Foreign Application Priority Data

May 8, 2014 (JP) .................................. 2014096667

(51) Int. Cl.
*G06F 3/06* (2006.01)
*G06F 21/60* (2013.01)
(Continued)

(52) U.S. Cl.
CPC .............. *G06F 21/60* (2013.01); *G06F 3/061* (2013.01); *G06F 3/0652* (2013.01);
(Continued)

(58) Field of Classification Search
CPC ......... G11C 16/08; G11C 16/10; G11C 16/26; G11C 16/16; G11C 8/00; G11C 29/82;
(Continued)

(56) References Cited

U.S. PATENT DOCUMENTS 6,125,078 A * 9/2000 Ooishi ................. G11C 7/1045
365/230.03
6,470,425 B1 * 10/2002 Yamashiroya ........ G06F 12/126
711/133

(Continued)

FOREIGN PATENT DOCUMENTS

| JP | 2009175877 | 8/2009 |
| KR | 20090043823 | 5/2009 |
| KR | 20090094195 | 9/2009 |

OTHER PUBLICATIONS

"Office Action of Korean Counterpart Application," dated Jul. 27, 2015, p. 1-p. 8, with English translation thereof.

*Primary Examiner* — Yaima Rigol
*Assistant Examiner* — Edward Waddy, Jr.
(74) *Attorney, Agent, or Firm* — J.C. Patents (57) ABSTRACT

The invention provides a flash memory which may effectively protect information with a high security level. A flash memory includes a setting part. When the setting part is inputted a specific command, the setting part sets up specific address information to a nonvolatile configuration register, and sets up specific data in a hidden storage region. The flash memory also includes: a comparing part, which compares inputted address information and the specific address information during a reading operation; and a control part, which reads specific data set in the storage region and erases a specific address when two address information are consistent, and reads data stored in a memory array according to the inputted address information when two address information are inconsistent.

10 Claims, 9 Drawing Sheets

(51) Int. Cl.
  *G06F 9/00* (2006.01)
  *G06F 21/57* (2013.01)
  *G06F 21/79* (2013.01)
  *G11C 16/08* (2006.01)
  *G11C 16/22* (2006.01)
  *G11C 16/26* (2006.01)

(52) U.S. Cl.
  CPC .......... *G06F 3/0655* (2013.01); *G06F 3/0688* (2013.01); *G06F 9/00* (2013.01); *G06F 21/575* (2013.01); *G06F 21/79* (2013.01); *G11C 16/08* (2013.01); *G11C 16/22* (2013.01); *G11C 16/26* (2013.01); *G06F 2221/2135* (2013.01)

(58) Field of Classification Search
  CPC . G11C 2216/22; G11C 11/5642; G06F 21/79; G06F 3/064; G06F 3/0688; G06F 3/061; G06F 3/0614; G06F 3/0652; G06F 3/0655; G06F 3/0679; G06F 9/5016; G06F 11/1008; G06F 12/0246; G06F 2212/1016; G06F 2212/1044; G06F 2212/2022; G06F 9/3834
  USPC .................. 711/103, E12.037, 170, E12.001, 711/E12.033, 100, 101, 102, 141, 156; 365/185.29, 185.33, 218
  See application file for complete search history.

(56) References Cited

U.S. PATENT DOCUMENTS

| | | | |
|---|---|---|---|
| 2010/0131708 A1* | 5/2010 | Park ................. | G11C 13/0069 711/115 |
| 2010/0205350 A1* | 8/2010 | Bryant-Rich ....... | G06F 12/0223 711/103 |
| 2011/0280086 A1* | 11/2011 | Choi .................. | G11C 7/1048 365/189.07 |
| 2012/0131306 A1* | 5/2012 | Bratt ................. | G06F 12/1027 711/205 |
| 2013/0254463 A1* | 9/2013 | Matsunaga ......... | G06F 12/0246 711/103 |
| 2014/0115235 A1* | 4/2014 | Ito ..................... | G06F 12/0868 711/103 |

* cited by examiner

SEMICONDUCTOR MEMORY DEVICE, SEMICONDUCTOR SYSTEM AND READING METHOD

CROSS-REFERENCE TO RELATED APPLICATION

This application claims the priority benefit of Japan application serial no. 2014-096667, filed on May 8, 2014. The entirety of the above-mentioned patent application is hereby incorporated by reference herein and made a part of this specification.

BACKGROUND OF THE INVENTION

1. Field of the Invention

The invention relates to a semiconductor memory device such as a Not AND (NAND) flash memory, and particularly relates to storing and reading of information with a high security level.

2. Description of Related Art

A NAND flash memory has a memory cell array, and the memory cell array includes a NAND string serially connecting a plurality of memory cells. Compared with a NOT OR (NOR) flash memory, the NAND flash memory is capable of realizing a memory cell array having a high density, and is thus suitable for data storage with a large capacity for image or music data. In addition to such purpose, the NAND flash memory also functions as the memory providing a boot code when an electronic apparatus or system is booting. The boot code is data for booting an electronic apparatus at a host side or an operating system of the system.

Figure 1A:
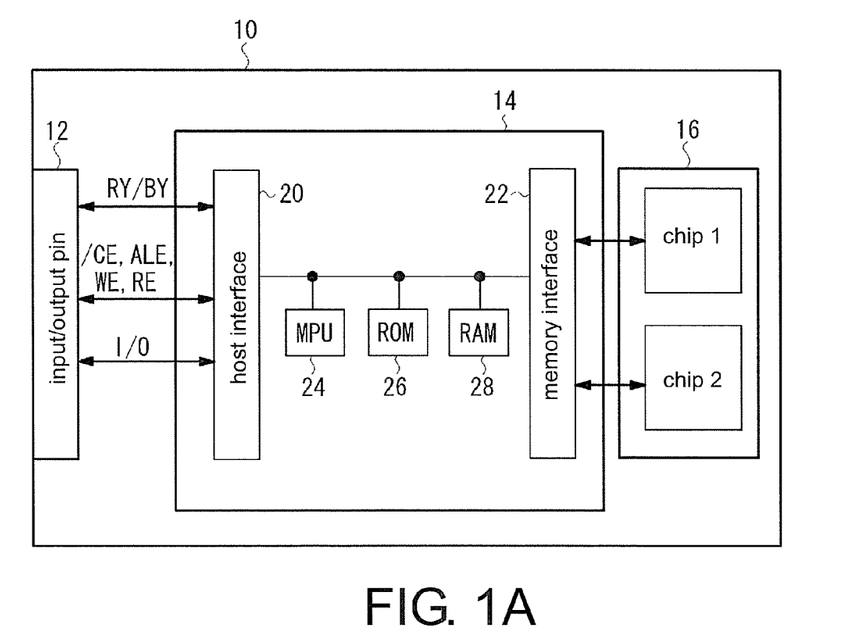
FIGS. 1A and 1B are diagrams illustrating a conventional configuration of a semiconductor memory system outputting a boot code.
Figure 1B:
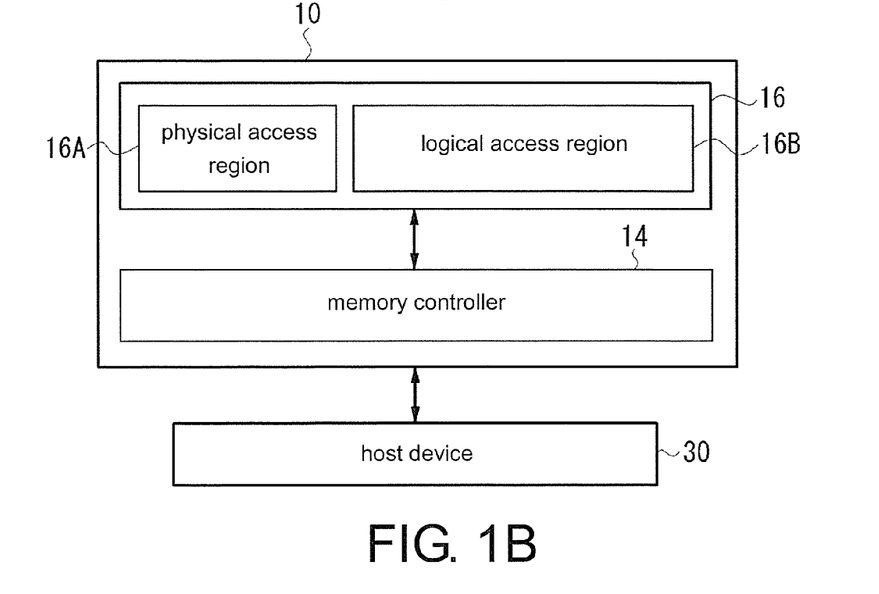

FIGS. 1A and 1B are diagrams illustrating a system configuration of a conventional semiconductor memory capable of outputting the boot code to a host system. As shown in FIG. 1B, a semiconductor memory 10 is connected to a host device 30 through a bus and so on. As shown in FIG. 1A, the semiconductor memory 10 has an input/output pin 12 for inputting and outputting data with the host device 30, a memory controller 14, and a memory part 16. The memory controller 14 includes a host interface 20 for data transmission with the host device 30 through the input/output pin 12, a memory interface 22 for data transmission with the memory part 16, a micro-processing unit (MPU) 24 controlling the data transmission, and a read only memory (ROM) 26 and a random access memory 28 for storing programs or data. The memory part 16 includes two NAND flash memory chips, for example. Also, as shown in FIG. 1B, the memory part 16 includes a physical access region 16A accessible with a physical address and a logical access region 16B accessible with a logical address. The boot code of the host device 30 is stored in the physical access region 16A. The boot code is data for booting an operating system of the host device 30. Based on the configuration, under the circumstance that the host device 30 only supports physical access, the boot code may be provided to the host device 30 (Patent Document 1).

Conventional Art

Patent Document 1: Japan Patent Publication No. 2009-175877.

In a host system using the NAND flash memory as the memory for storing the boot code, the boot code may be read from the flash memory when the system is booting or when power is supplied, so as to boot the system. Besides, the following applications are included in addition to the boot code: classified important information having a high security level stored in advance, wherein the information is read and used for system control. For example, the application may be as follows: storing in advance a system-specific security code or decryption key in the flash memory. If the security code cannot be read, the memory system is unable to operate normally. More specifically, the application may be allowed to boot the operating system or software stored in the flash memory by matching of the security code. Besides, as another example, another application may be as follows: storing in advance highly private personal information in the flash memory and using the personal information in a specific program.

However, storing in advance the information with a high security level in the flash memory and reading the information during an operation renders the following issues. The risk of information leakage increases if important information such as security code or private information is read multiple times. For example, sometimes the information may be read or replicated without authorization by a non-specified system or a hostile user. Thus, the protection may not be deemed as sufficient. Besides, while it is possible to set such information to be accessible only when booting, similar to the boot code, the time limitation on using the information may be too restrictive.

SUMMARY OF THE INVENTION

The invention provides a semiconductor memory device having a novel structure and capable of effectively protecting information with a high security level.

The semiconductor memory device of the invention includes: a NAND memory array; an input part, inputting address information and data; a reading part, reading data stored in the NAND memory array based on the address information input from the input part; a setting part, setting up, to an address storage region, the input address information as specific address information when a specific command is input from the input part, and setting up, to a data storage region, the data input from the input part as specific data; and a control part, controlling the reading part, wherein the control part compares the input address information and the specific address information during a reading operation, when the address information are consistent, the specific data set in the data storage region is read and the specific address information is erased or set to be invalid, and when the address information are inconsistent, data stored in the memory array is read based on the input address information.

Preferably, the setting part includes a non-volatile address storage region and a volatile address storage region, the setting part keeps the specific address information set in the non-volatile address storage region in the volatile address storage region in response to a power being turned on, and the control part erases the specific address information kept in the volatile address storage region when the input address information and the specific address information are consistent. Preferably, the specific address information also serves as an address for selecting an address space of the memory array. Preferably, the data storage region is set in a region different from a memory array that a user is able to use. Preferably, the address storage region is a configuration register. Preferably, the control part includes a counting part, the counting part counts the number of times that the input address information and the specific address information are consistent, and the control part erases the specific address information when an outcome of counting of the counting part reaches a predetermined value.

A method for reading specific data of the invention is used in a semiconductor memory system including a semiconductor memory device and a host device. The method includes: outputting a specific command to the semiconductor memory device, setting up specific address information to an address storage region of the semiconductor memory device, and setting up the specific data to the data storage region; during a reading operation, comparing input address information and the specific address information, reading the specific data set in the data storage region and erasing the specific address information or setting the specific address information to be invalid when the address information are consistent, and reading data stored in a memory array according to the input address information when the address information are inconsistent.

Preferably, the reading method further includes keeping the specific address information set in a non-volatile address storage region in a volatile address storage region after a system power is turned on, and erasing the specific address information of the volatile address storage region when the address information are consistent. Preferably, after the system power is turned on again, the specific address information set in the non-volatile address storage region is kept in the volatile address storage region. Preferably, the reading method further includes counting the number of times that the input address information and the specific address information are consistent, and erasing the specific address information when an outcome of counting reaches a predetermined value.

According to the invention, the specific data is read and the specific address information is erased or set to be invalid when the input address information and the specific address information are consistent. Therefore, reading of the specific data thereafter is limited. Thus, the security level of specific data is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 2:
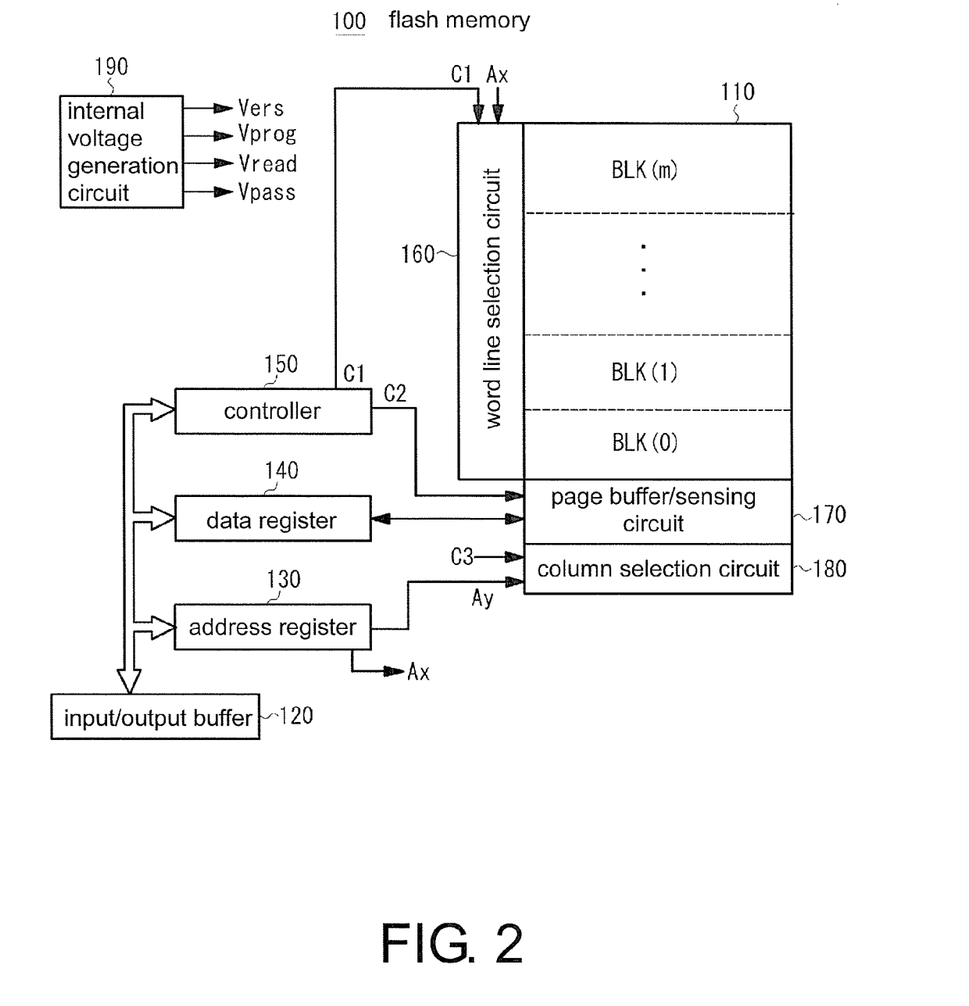
FIG. 2 is a diagram illustrating an exemplary configuration of a flash memory according to an embodiment of the invention.

In the following, the embodiments of the invention are described in detail with reference to the accompanying drawings. FIG. 2 is a diagram illustrating a configuration of a flash memory according to an embodiment of the invention. However, the configuration of the flash memory illustrated herein only serves as an illustrative example. The invention is not limited to the configuration illustrated herein.

As shown in FIG. 2, a flash memory 100 of this embodiment is configured to include a memory array 110 formed with a plurality of memory cells arranged in an array, an input/output buffer 120 connected to an external input output terminal I/O and keeping input and output data, an address register 130 receiving an address data from the input/output buffer 120, a data register 140 keeping the input and output data, and a controller 150 providing control signals C1, C2, C3, etc., to the respective parts based on command data from the input/output buffer 120 and an external control signal (e.g., chip enable or address latch enable control signal, etc. that are not shown herein), a word line selection circuit 160 decoding row address information Ax from the address register 130 and making block and word line selection based on an outcome of decoding, a page buffer/sensing circuit 170 keeping data read from a page selected by the word line selection circuit 160 or keeping data written to the selected page, a column selection circuit 180 decoding a column address information Ay from the address register 130 and selecting column data in the page buffer 170 based on an outcome of decoding, and an internal voltage generation circuit 190 generating a voltage required for data reading, programming, erasing, etc. (e.g., programming voltage Vprog, turn-on voltage Vpass, reading voltage Vread, and erasing voltage Vers, etc.).

The memory array 110 has a plurality of blocks BLK(0), BLK(1) . . . BLK(m) arranged in a column direction. At one end part of the blocks, the page buffer/sensing circuit 170 is disposed. However, the page buffer/sensing circuit 170 may also be disposed at the other end part or the end parts at both sides of the blocks.

Figure 3:
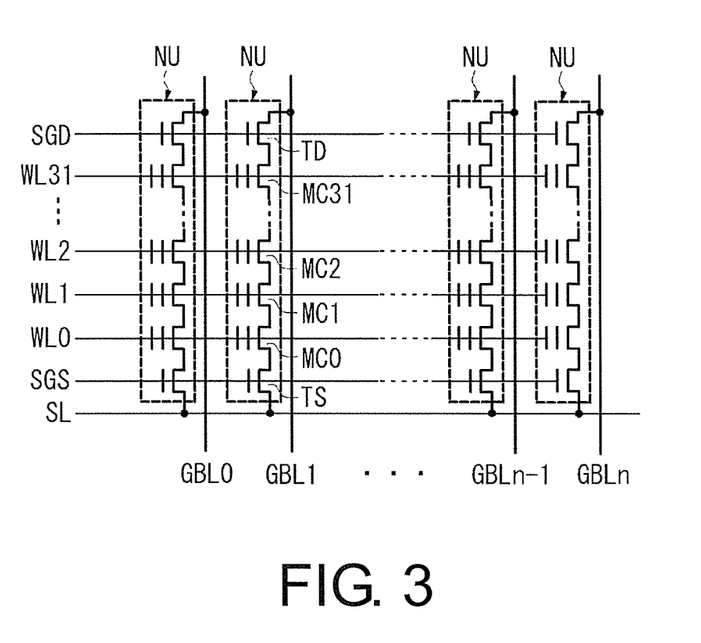
FIG. 3 is a circuit diagram illustrating a configuration of NAND strings according to an embodiment of the invention.

As shown in FIG. 3, a plurality of NAND string units NU are formed in a memory block. The NAND string unit NU is formed by serially connecting a plurality of memory cells. In one block, there are n+1 string units NU arranged in a row direction. The string unit NU includes a plurality of memory cells MCi (i=0, 1, . . . 31) serially connected, a selection transistor TD connected to a drain side of the memory cell MC31 serving as an end part, and a selection transistor TS connected to a source side of the memory cell MC0 serving as the other end part. In addition, a drain of the selection transistor TD is connected to a corresponding bit line GBL, while a source of the selection transistor TS is connected to a common source line SL.

Control gates of the memory cells MCi are connected to word lines WLi, and gates of the selection transistors TD and TS are connected with selection gate lines SGD and SGS parallel to the word lines WL. When selecting a block based on the row address Ax, the word line selection circuit 160 selectively drives the selection transistors TD and TS through the selection gate lines SGS and SGD of the block.

Typically, the memory cell has a metal-oxide-semiconductor (MOS) structure. The MOS structure includes a source/drain serving as a N-type diffusion region and formed in a P-well, a tunneling oxide film formed on a channel between the source/drain, a floating gate (charge accumulation layer) formed on the tunneling oxide film, and a control gate formed above the floating gate with separation of a dielectric. When the floating gate does not accumulate charges, i.e., when data "1" is written, a threshold value is in a negative state, and the memory cell is normally on. When the floating gate accumulates electrons, i.e., when data "0" is written, the threshold value is changed to be positive, and the memory cell is normally off. However, the memory cell is not limited to store a single bit, and may store multiple bits.

Table 1 is an example of respective bias voltages applied when performing operations of the flash memory. In a reading operation, a positive voltage is applied to the bit line, a voltage (e.g., 0V) is applied to the selected word line, the turn-on voltage Vpass (e.g., 4.5V) is applied to the non-selected word line, and a positive voltage (e.g., 4.5V) is applied to the selection gate lines SGD and SGS, and the bit line selection transistor TD and the source line selection transistor TS are turned on, and 0V is applied to the common source line. In a programming (writing) operation, a high voltage programming voltage Vprog (e.g., 15V to 20V) is applied to the selected word line, an intermediate voltage (e.g., 10V) is applied to the non-selected word line, the bit line selection transistor TD is turned on, the source line selection transistor TS is turned off, and a voltage corresponding to the data "0" or "1" is supplied to the bit line GBL. In an erasing operation, 0V is applied to the selected word line in the block, a high voltage (e.g., 20V) is applied to the P-well, and electrons of the floating gate are extracted to the substrate. Accordingly, data is erased in a block-based manner.

TABLE 1

|  | erasing | writing | reading |
|---|---|---|---|
| selected word line | 0 | 15 V to 20 V | 0 |
| non-selected word line | floating | 10 V | 4.5 |
| SGD | floating | Vcc | 4.5 |
| SGS | floating | 0 | 4.5 |
| SL | floating | Vcc | 0 |
| P-well | 21 | 0 | 0 |

Figure 4:
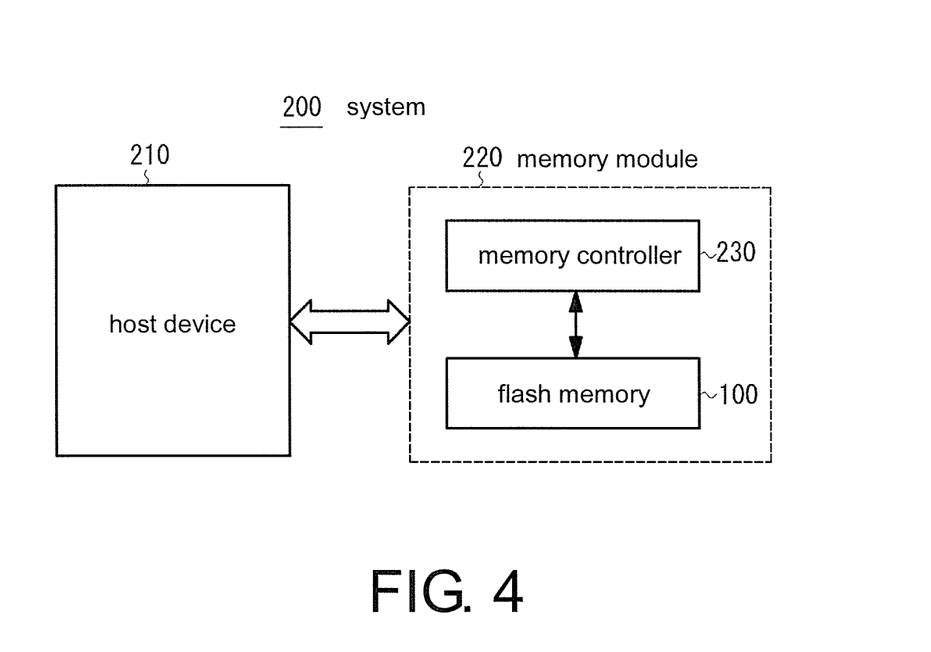
FIG. 4 is a schematic view illustrating a system including a flash memory according to an embodiment of the invention.

FIG. 4 is a diagram illustrating an example of a system including the flash memory according to an embodiment of the invention. A system 200 of this embodiment includes a host device 210 and a memory module 220 connected to the host device 210. There is no specific limitation on the host device 210. The host device 210 may be an electronic apparatus such as a computer, a digital camera, a printer, etc., or a chip disposed in a chipset. The memory module 220 includes a memory controller 230 having the same function of the memory controller 14 shown in FIGS. 1A and 1B and the flash memory 100. The memory controller 230 controls operations such as data transmission between the host device 210 and the flash memory 100.

To prevent leakage of information, the flash memory of this embodiment provides a one time read mode when information with a high security level is stored. If the one time read mode is set up, information set in a one time read region is only allowed to be read once after the power is turned on. The state remains until the power is turned on again. In other words, when the power is turned on again, the information set in the one time read region is again only allowed to be read once. Thus, the information with a high security level is prevented from being read multiple times during an operation of the system.

To make the one time read mode of the flash memory 100 effective, an initial setting is performed to the flash memory 100. In the initial setting, a predefined specific command different from a normal command is used to set specific address information to an address storage region and set classified information with a high security level to a one time read region. Preferably, only when the specific address information is consistent, the classified information set in the one time read region is allowed to be read once.

Figure 5:
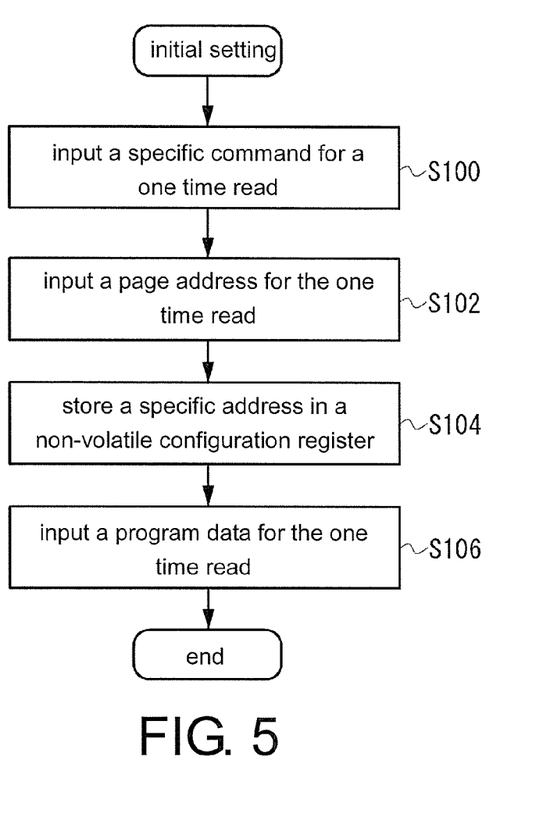
FIG. 5 is a flowchart illustrating an initial setting operation of a one time read mode of a flash memory according to an embodiment of the invention.

FIG. 5 is a flow chart illustrating the initial setting. First of all, the specific command for performing the initial setting is sent from the host device 210 to the memory module 220 (S100). The specific command is a command different from a normal programming start command (80h, 81h, 85h). Preferably, the specific command is a hidden command only known by a specific user or system. If the specific command sent from the host device 210 is received by a controller 150 of the flash memory 100, the controller 150 then starts a sequence for the initial setting based on the specific command.

Then, an address for the one time read is input from the host device 210 to the flash memory 100 (S102). Here, to be distinguished from a normal address, an address input when inputting the specific command is referred to as a specific address. The specific address may include a row address (page address) and a column address, but may only include the row address (page address) when the whole page is selected. If the specific address is input, the controller 150 then stores the specific address in a non-volatile address storage region (S104). Preferably, the non-volatile address storage region is a non-volatile configuration register (CR).

Figure 6:
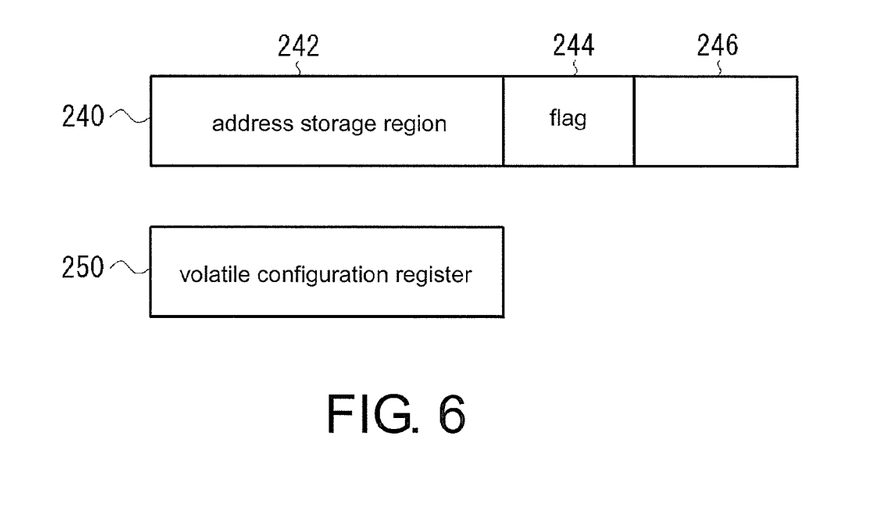
FIG. 6 is a diagram illustrating an example of non-volatile and volatile configuration registers of a flash memory.

As shown in FIG. 6, the flash memory 100 of this embodiment has a non-volatile configuration register 240 and a volatile configuration register 250. Usually, reading or writing of the non-volatile configuration register 240 and the volatile configuration register 250 is not allowed to be performed by the user during operation, but is allowed to perform reading or writing by executing a specific mode or command.

The non-volatile configuration register 240 includes an address storage region 242 storing the specific address and a flag region 244 indicating that the specific address is stored in the address storage region 242. The non-volatile configuration register 240 further includes a region 246 for setting operation information of the flash memory 100. The region 246 stores information required for starting the flash memory, for example. The non-volatile configuration register 240 includes a memory element such as a NOR or NAND memory element, electrically erasable programmable read-only memory (EEPROM), magnetic random access memory (MRAM), resistive random access memory (ReRAM), etc., for example.

The volatile configuration register 250 is capable of keeping information such as the specific address read from the non-volatile configuration register 240 after the system is booted. The volatile configuration register 250 includes a memory element such as static random access memory (SRAM), dynamic random access memory (DRAM), etc., for example.

It should be noted here that the specific address refers to an address space available to the user in the memory array 110, and also serves as identification information configured to make one time read possible. In addition, when the specific address is input during the initial setting, the word line selection circuit 160 does not select a page of the memory array 110, but selects a page of a storage region hidden in the memory array 110. The hidden storage region is a non-volatile programmable storage region and, for example, is set in a region separated from the memory array 110 available to the user.

Figure 7:
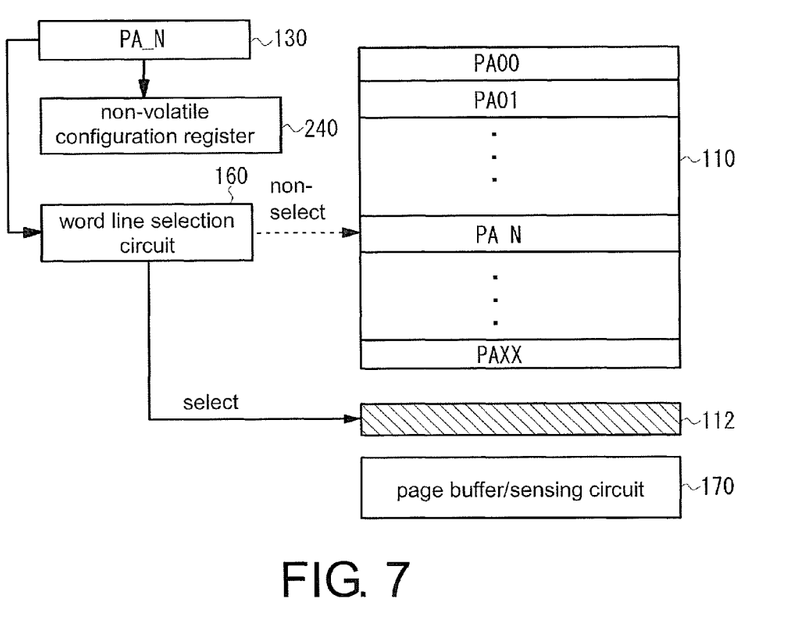
FIG. 7 is a diagram illustrating writing program data in an initial setting of a flash memory according to an embodiment of the invention.

FIG. 7 is a diagram illustrating a specific example of the initial setting. After the specific command is input, "PA_N" is then input as the specific page address. In addition, the specific address only includes the page address. If the specific page address PA_N is input to the address register 130, the specific address PA_N is then stored in the address storage region 242 of the non-volatile configuration register 240 under the control of the controller 150.

The specific page address PA_N is a page of the address space available to the user in the memory array 110, but the word line selection circuit 160 does not select the specific page address PA_N of the memory array 110 but selects a hidden storage region 112 of the memory array 110. Although the hidden storage region 112 may be physically formed in the memory array 110, the hidden storage region 112 is a data storage region that the user is not able to specify the address, and is thus not able to use. The hidden storage region 112, like the memory array 110, is formed in a block including the NAND string units, for example. When the specific command is input, the hidden storage region 112 may be selected through the word line selection circuit 160. In addition, the hidden storage region 112 may also include a memory element other than the NAND string unit. For example, the storage region 112 may also include a memory element including MRAM, ReRAM, EEPROM, NOR, etc. Under such circumstance, it is not necessary to use the word line selection circuit 160 to access the storage region 112. Other specialized selection circuits may also be used.

Back to FIG. 5 again, program data for the one time read is then input (S106). The program data is classified information having a high security level, such as a security code, decryption key, private information, etc. The input program data is supplied to the page buffer/sensing circuit 170 through the data register 140, as shown in FIG. 7, and is programmed in a page of the hidden storage region 112. When a size of the program data is less than one page, the program data may be supplied to the bit line selected by the column selection circuit 180 based on the specific address. On the contrary, when the size of the program data is more than one page, the specific page address PA_N may be designated as a preceding page to write the program data to a page continued from the preceding page. In this way, the initial setting for the one time read is completed.

Figure 8:
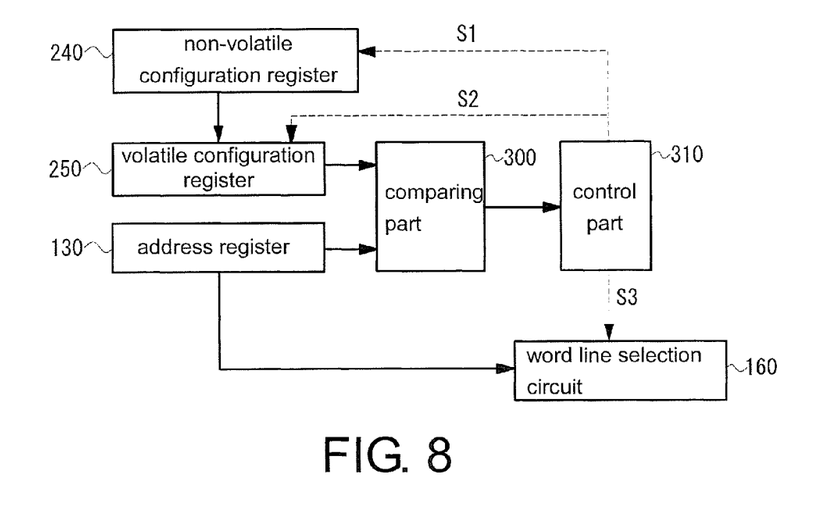
FIG. 8 is a diagram illustrating a functional configuration controlling a flash memory according to an embodiment of the invention in a one time read.

Then, details with respect to a one time read operation of the flash memory of this embodiment are described below. The controller 150 includes a program or a state machine for controlling the one time read mode. FIG. 8 is a frame diagram illustrating a functional configuration when the controller 150 controls the one time read mode. In FIG. 8 a comparing part 300 compares the address input to the address register 130 and the specific address kept in the volatile configuration register 250 when performing a page reading of the flash memory 100, and a control part 310 controls the respective element based on an outcome of comparison of the comparing part 300.

As described in the following, during a power up sequence of the flash memory 100, the control part 310 performs controls S1, S2, S3, etc. The control S1 is performed to make the specific address stored in the non-volatile configuration register 240 be transmitted to and kept in the volatile configuration register 250. The control S2 is performed to erase the specific address kept in the volatile configuration register 250 when the comparing part 300 indicates that the addresses are consistent. The control S3 is performed to allow the word line selection circuit 160 to select the page of the hidden storage region 112 when the comparing part 300 indicates that the addresses are consistent.

Figure 9:
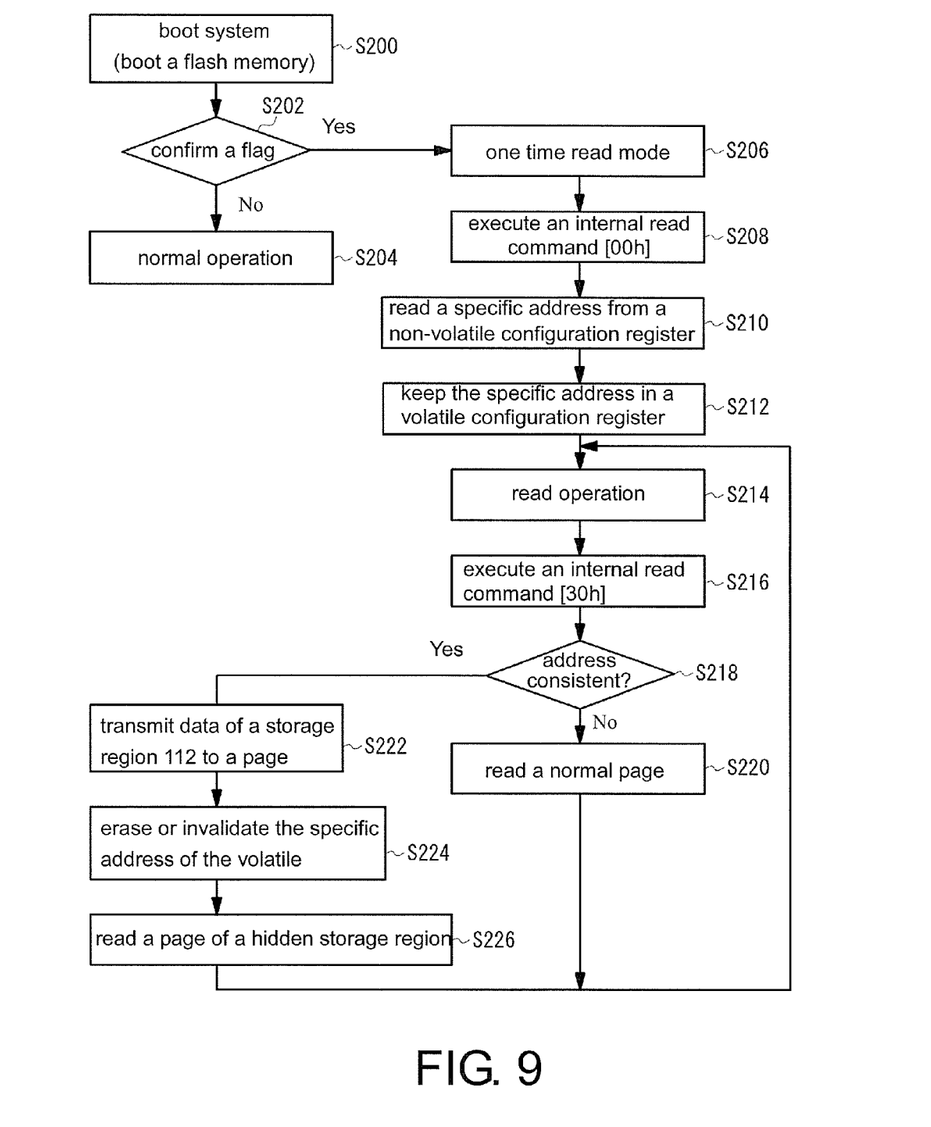
FIG. 9 is a flowchart illustrating a one time read operation of a flash memory according to an embodiment of the invention.

Then, with reference to a flow chart as shown in FIG. 9, the one time read operation of this embodiment is described with more details. In this example, the specific page address is set up to the address storage region 242 of the non-volatile configuration register 240 in the initial setting, and a column address is not set.

If the system 200 shown in FIG. 4 boots and supplies power to the flash memory 100 (S200), the controller 150 then starts using the program or state machine for the power up sequence. First of all, the controller 150 accesses the non-volatile configuration register 240, checks a flag set in the flag region 244, and determines whether the initial setting is being performed (S202). If the initial setting is not performed, the controller 150 is not switched to the one time read mode, but performs a normal operation (S204).

Figure 10A:
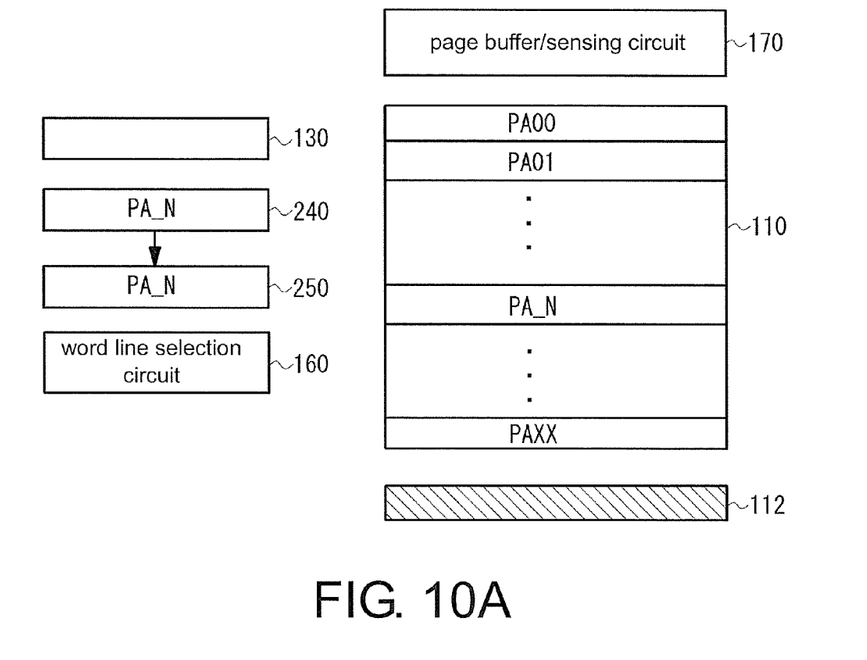
FIG. 10A is a diagram illustrating an operation setting a specific address to a volatile configuration register.

Alternatively, when the flag is set, i.e., the initial setting is completed, the controller 150 is switched to the one time read mode to perform control of the one time read (S206). If it is switched to the one time read mode, the controller 150 then executes an internal read command "00 h," as the specific page address is stored in the non-volatile configuration register 240 (S208). By executing "00 h," the specific page address is read from the address storage region 242 of the non-volatile configuration register 240 (S210), and the specific page address is kept in the volatile configuration register 250 (S212). FIG. 10A illustrates a circumstance where the specific page address PA_N is set in the volatile configuration register 250. Processes before S212 is performed through the power up sequence.

Then, the host device 210 perform is a reading operation to the flash memory 100 (S214). In the reading operation, the flash memory 100 receives the read command and address from the host device 210 as usual. In response to the reading operation, the controller 150 executes an internal read command "30 h" (S216). By executing the command, the address input to the address register 130 is read.

Figure 10B:
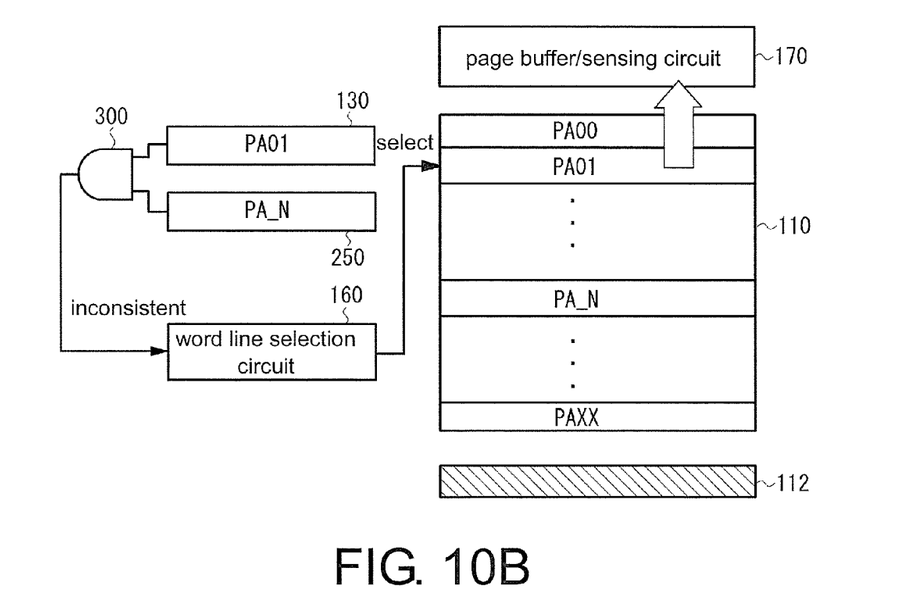
FIG. 10B is a diagram illustrating an operation when a specific address is inconsistent with an input address.

Then, the comparing part 300 compares the specific page address kept in the volatile configuration register 250 and the page address read from the address register 130 and determines whether the addresses are consistent (S218). If the addresses are inconsistent, a normal page reading operation is performed (S220). Namely, the input page address is selected through the word line selection circuit 160, the data of the selected page is transmitted to the page buffer/sensing circuit 170, and the data is output to the host device 210 through the input/output buffer 120. FIG. 10B illustrates an example of inputting PA01 as the page address. Since the page address PA01 is inconsistent with the specific page address PA_N, the word line selection circuit 160 selects the page address PA01 and reads the data of the page address PA01.

Alternatively, when the comparing part 300 determines that the input page address is consistent with the specific address (S218), the controller 150 (control part 310 makes the word line selection circuit 160 select the page of the hidden storage region 112 and transmit the data stored in the storage region 112 to the page buffer/sensing circuit 170 (S222). Then, the control part 310 erases or invalidates the specific page address kept in the volatile configuration register 250 (S224). Then, the data of the page stored in the storage region 112 is read from the input/output buffer 120 (S226).

Figure 10C:
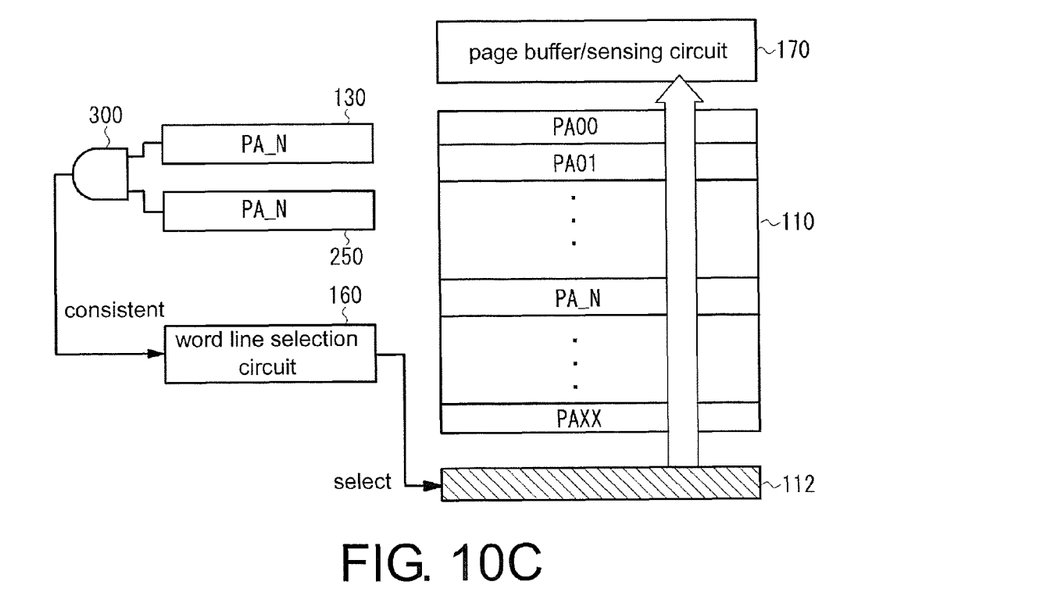
FIG. 10C is a diagram illustrating an operation when a specific address is consistent with an input address.

FIG. 10C illustrates an example of inputting the specific page address PA_N as the page address. Since the input page address PA_N is consistent with the specific page address PA_N, the word line selection circuit 160 selects the page of the hidden storage region 112, and transmits the data stored in the page to the page buffer/sensing circuit 170. It should be noted that at this time, the specific page address PA_N of the memory array 110 is not selected.

Figure 10D:
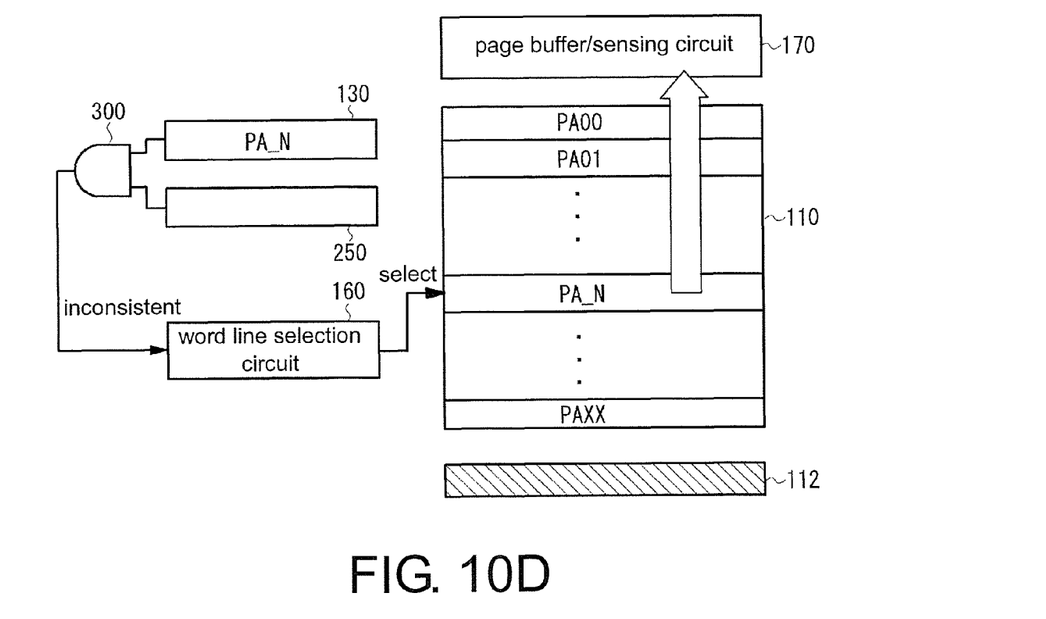
FIG. 10D is a diagram illustrating an example of reading after a one time read operation.

In this way, if the input page address and the specific page address are consistent, the data stored in the page of the hidden storage region 112 may be read, but the reading is limited to be one time only. In other words, if the page address consistent with the specific page address is input once, the specific page address kept in the volatile configuration register 250 is erased or invalidated. Therefore, even if the page address consistent with the specific page address is input again, the comparing part 300 still determines that the addresses are inconsistent, instead of being consistent. Thus, the word line selection circuit 160 does not select the page of the hidden storage region 112. FIG. 10D illustrates an example that the page address consistent with the specific page address is input after the one time read. When the page address PAN is input, since the volatile configuration register 250 does not substantially keep the specific page address, the comparing part 300 determines that the addresses are inconsistent. Therefore, the word line selection circuit 160 does not select the page of the hidden storage region 112. Instead, the word line selection circuit 160 selects the specific page address PA_N of the memory array 110, and data stored in the specific page address PA_N is read.

According to this embodiment, when information with a high security level, such as the security code, decryption key, or private information, is stored in the flash memory, the read times of the information with a high security level is limited to once. Thus, important information is prevented from being read or replicated easily. In addition, by programming dummy data as the specific page address PA_N of the memory array 110 in the user region, the system may trace the illegal access when the dummy data is read due to a hostile or illegal access.

Even though the example shown in FIG. 9 shows that the flag is set to the non-volatile configuration register 240, and the mode is switched to the one time read mode when the flag is set (S202 and S206), setting the flag or using the flag for determination is not necessary. In another exemplary embodiment, the flash memory 100 may selectively execute the one time read or normal operation without assistance of the flag setting when the power is on. When the one time read is not executed, namely when the initial setting is not performed to the non-volatile configuration register 240, the address storage region 242 of the non-volatile configuration register 240 is at default, so address information in an erase state (data that are all "F") is transmitted to the volatile configuration register 250. When the page address information in the erase state and the address information that the user may choose are inconsistent, the normal reading operation is straightforwardly performed. Alternatively, if the specific address is set up to the address storage region 242, through the same operation, the data stored in the hidden storage region may be read when the specific address and the address chosen by the user are consistent.

Figure 11:
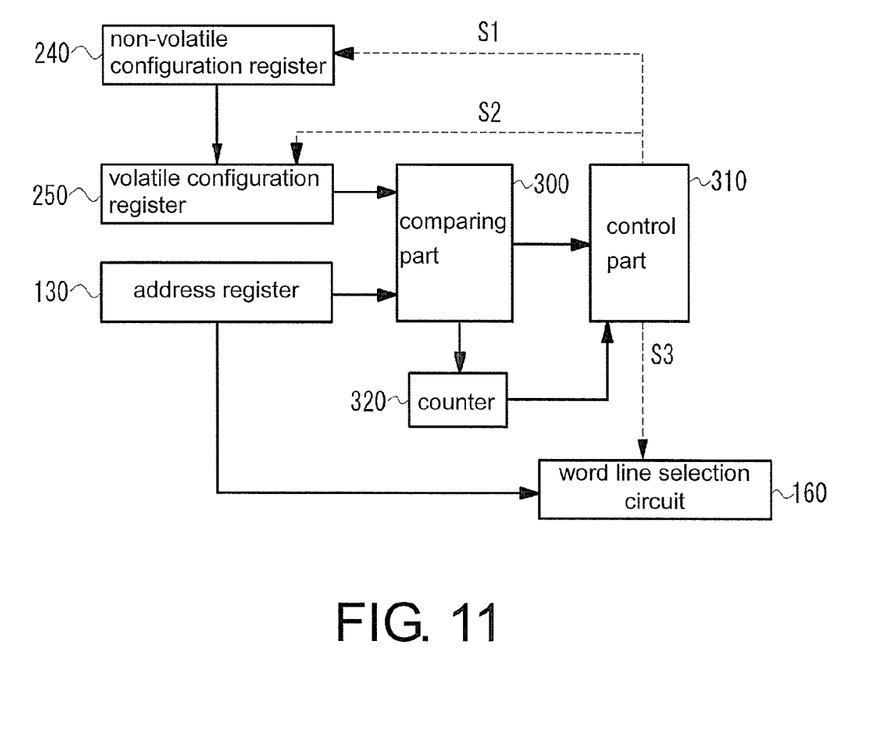
FIG. 11 is a diagram illustrating a functional configuration controlling a flash memory according to a second embodiment of the invention in a one time read.

In the following, a second exemplary embodiment is described below. The previous embodiment is an example of one time read, while the second embodiment allows reading for multiple but limited times. FIG. 11 is a diagram illustrating a functional configuration of the second embodiment. In the second embodiment, a counter 320 is further added. The counter 320 counts the number of times that the addresses determined by the comparing part 300 are consistent. The counter 320 notifies the control part 310 when the number of times that the addresses are consistent reaches a predetermined number of times N. The control part 310 responds to the notification and erases or invalidates the specific page address kept in the volatile configuration register 250. Thus, the data stored in the hidden storage region 112 is only allowed to be read for the limited number of times N.

Although the exemplary embodiments of the invention are described in detail, the invention is not limited to a specific embodiment. Modifications and variations can be made provided that the modifications and variations are not departed from the scope of the invention recited in the claims.

In the embodiments, if the specific page address in the initial setting is the user region, the address may be set at an arbitrary position. Thus, the freedom of address mapping may be expanded. In addition, while the embodiments are described with examples of storing the specific page address in the configuration register, the specific page address is not required to be stored in the configuration register, and may be stored in other storage regions. Moreover, while the embodiments use "00 h" and "30 h" as the internal read commands executed by the flash memory, the invention is not limited thereto. The invention applies as long as the command or control signal set in the page address of the register may be read.

Furthermore, while the embodiments show the specific page address as an example, the invention is not limited thereto. It is also possible to use multiple specific page addresses, and data programming may be performed to the storage region 112 corresponding to multiple specific page addresses.

What is claimed is:

1. A semiconductor memory device, comprising:
a NAND memory array;
an input part, inputting an address information, a data, and a specific command which instructs to store a first address information and a first data, wherein the specific command is received from a host device, and comprises the first address information and the first data;
a reading part, reading the data stored in the NAND memory array based on the address information input from the input part;
a setting part, storing the first address information in an address storage region of the semiconductor memory device as a specific address information according to the inputted specific command, wherein the setting part storing the first data in a hidden data storage region of the semiconductor memory device as a specific data according to the inputted specific command, wherein the first data is not stored in a first address, of the NAND memory array, indicated by the first address information; and a control part, controlling the reading part, wherein the control part, during a reading operation, compares the specific address information with a second address information input from the input part, wherein the reading operation is for reading a second data stored in a second address of the NAND memory array which indicated by the second address information, wherein when the second address information and the specific address information are inconsistent, the reading part does not read the specific data from the hidden data storage region, but reads the second data from the second address of the NAND memory array according to the second address information, wherein when the second address information and the specific address information are consistent, the control part erases or invalidates the specific address information stored in the address storage region, and the reading part reads the specific data from the hidden data storage region.

2. The semiconductor memory device as claimed in claim 1, wherein the setting part comprises a non-volatile address storage region and a volatile address storage region, and the address storage region is the non-volatile address storage region, wherein the setting part transmits and stores the specific address information stored in the non-volatile address storage region to the volatile address storage region after a power is turned on, and the control part erases the specific address information stored in the volatile address storage region when the second address information and the specific address information are consistent.

3. The semiconductor memory device as claimed in claim 1, wherein the specific address information also serves as an address allowing to select an address space of the NAND memory array.

4. The semiconductor memory device as claimed in claim 1, wherein the hidden data storage region is set in a region different from a memory array that a user is able to use.

5. The semiconductor memory device as claimed in claim 1, wherein the address storage region is a configuration register.

6. The semiconductor memory device as claimed in claim 1, wherein the control part comprises a counting part, the counting part counts the number of times that the second address information input from the input part and the specific address information are consistent, and in the operation of the control part erases or invalidates the specific address information stored in the address storage region when the second address information and the specific address information are consistent, the control part erases or invalidates the specific address information when an outcome of counting of the counting part reaches a predetermined value.

7. A semiconductor system, comprising the semiconductor memory device as claimed in claim 1 and a host device connected to the semiconductor memory device, wherein the host device outputs the specific address information and the specific data to the semiconductor memory device through the specific command.

8. A reading method for reading a specific data in a system comprising a semiconductor memory device and a host device, comprising:

outputting a specific command to the semiconductor memory device by the host device, wherein the specific command comprises a specific address information and a specific data, and instructs to store the specific address information and the specific data;

according to the specific command, storing the specific address information to an address storage region of the semiconductor memory device, and storing the specific data to a hidden data storage region of the semiconductor memory device, wherein the specific data is not stored in a first address, of the NAND memory array, indicated by the specific address information;

during a reading operation, comparing the specific address information with an input address information corresponding to the reading operation, wherein the reading operation is for reading a data stored in a second address, which indicated by the input address information, of the NAND memory array of the semiconductor memory device;

when the input address information and the specific address information are inconsistent, not reading the specific data from the hidden data storage region, but read the data from the second address of the NAND memory array according to the input address information, when the input address information and the specific address information are consistent, erasing or invalidating the specific address information stored in the address storage region, and reading the specific data from the hidden data storage region.

9. The reading method as claimed in claim 8, wherein the semiconductor memory device comprises a non-volatile address storage region and a volatile address storage region, and the address storage region is the non-volatile address storage region, wherein the reading method further comprises transmitting and storing the specific address information stored in a non-volatile address storage region to the volatile address storage region after a system power is turned on, and erasing the specific address information of the volatile address storage region when the input address information and the specific address information are consistent.

10. The reading method as claimed in claim 8, wherein the reading method further comprises:

counting the number of times that the input address information and the specific address information are consistent; and erasing or invalidating the specific address information when an outcome of counting reaches a predetermined value.

* * * * *